US011188235B2

(12) United States Patent
Masuda et al.

(10) Patent No.: US 11,188,235 B2
(45) Date of Patent: Nov. 30, 2021

(54) REDUCING DATA REPLICATIONS AMONG STORAGE LOCATIONS

(71) Applicant: International Business Machines Corporation, Armonk, NY (US)

(72) Inventors: Koichi Masuda, Tokyo (JP); Takahiro Tsuda, Tokyo (JP); Sosuke Matsui, Machida (JP); Yuki Asakura, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 16/696,479

(22) Filed: Nov. 26, 2019

(65) Prior Publication Data

US 2021/0157486 A1    May 27, 2021

(51) Int. Cl.
*G06F 3/06* (2006.01)
(52) U.S. Cl.
CPC .......... *G06F 3/0611* (2013.01); *G06F 3/0608* (2013.01); *G06F 3/0652* (2013.01); *G06F 3/0676* (2013.01)
(58) Field of Classification Search
CPC .... G06F 3/0611; G06F 3/0608; G06F 3/0652; G06F 3/0676
See application file for complete search history.

(56) References Cited

U.S. PATENT DOCUMENTS

| 10,191,814 B2 | 1/2019 | Haustein et al. | |
|---|---|---|---|
| 2016/0041758 A1* | 2/2016 | Iwasaki | G06F 3/0685 |
| | | | 711/103 |
| 2018/0018089 A1 | 1/2018 | Araki et al. | |
| 2018/0121464 A1 | 5/2018 | Araki et al. | |
| 2019/0005106 A1 | 1/2019 | Kalach et al. | |
| 2019/0087342 A1* | 3/2019 | Masuda | G06F 3/0647 |
| 2019/0250844 A1* | 8/2019 | Kawamura | G06F 3/0649 |

* cited by examiner

*Primary Examiner* — David Yi
*Assistant Examiner* — Tahilba O Puche
(74) *Attorney, Agent, or Firm* — Zilka-Kotab, P.C.

(57) ABSTRACT

A computer-implemented method, according to one embodiment, includes: receiving a volume at a first cluster in a first tier of a tiered data storage system. The first tier includes of a plurality of clusters, and the first cluster is coupled to a secondary storage in a second tier. A determination is made as to whether any clusters in the first tier are designated as copy target locations for the volume. In response to determining that one or more of the clusters in the first tier are designated as a copy target location, for each of the one or more clusters designated as a copy target location: a determination is made as to whether the given cluster is coupled to the secondary storage. Moreover, in response to determining that the given cluster is not coupled to the secondary storage, a copy of the volume is sent to the given cluster.

19 Claims, 14 Drawing Sheets

650

| Secondary storage | Copy policy | Preference group | Premigrate queue |
|---|---|---|---|
| C1 | 2ndS_A | N | PG0 | 100GB |
| C2 | 2ndS_A | Y | PG0 | 200GB |
| C3 | 2ndS_A | Y | PG0 | 300GB |
| C4 | 2ndS_A | Y | PG0 | 400GB |
| C5 | 2ndS_B | Y | PG1 | 200GB |
| C6 | 2ndS_B | Y | PG0 | 100GB |
| C7 | 2ndS_B | Y | PG1 | 300GB |
| C8 | 2ndS_C | Y | PG1 | 100GB |

REDUCING DATA REPLICATIONS AMONG STORAGE LOCATIONS

BACKGROUND

The present invention relates to data storage systems and more specifically, this invention relates to reducing the number of data replications that are performed among storage locations.

In conventional data replication systems, users issue input/output (I/O) requests to a single storage location, such as a primary storage location, which ultimately modifies data according to in the I/O requests that are received. In an effort to increase data retention, conventional data replication systems sometimes also implement additional storage locations which are used to maintain additional (e.g., backup) copies of the data stored at the primary storage location. These redundant copies of the data at the recovery storage locations are particularly useful in situations where the primary storage location becomes unavailable and/or experiences data loss. In some situations, the recovery storage locations are even able to assume operational responsibility in response to determining that the primary storage location is unable to.

In such conventional systems, the primary storage location forwards the I/O requests received from the users to the secondary storage locations for implementation therein. While it does improve data retention, this data storage scheme experiences a notable increase in processing overhead as a result of satisfying these additional requests. For instance, I/O requests are transferred between each of the locations, introducing performance delays which increase with the number of locations implemented. Moreover, a failure event experienced at any of the locations and/or the connections extending therebetween disrupts the transfer of I/O requests therebetween and results in more than one copy of data to become out-of-synch. In turn, this must be remedied before the system is operational, thereby introducing additional performance delays.

SUMMARY

A computer-implemented method, according to one embodiment, includes: receiving a volume of data at a first cluster in a first tier of a tiered data storage system. The first tier of the tiered data storage system includes of a plurality of clusters, and the first cluster is coupled to a secondary storage in a second tier of the tiered data storage system. A determination is made as to whether any of the remaining clusters in the first tier are designated as copy target locations for the volume. In response to determining that one or more of the remaining clusters in the first tier are designated as a copy target location for the volume, for each of the one or more clusters designated as a copy target location for the volume: a determination is made as to whether the given cluster is coupled to the secondary storage. Moreover, in response to determining that the given cluster is not coupled to the secondary storage, a copy of the volume is sent to the given cluster.

A computer program product, according to another embodiment, includes a computer readable storage medium having program instructions embodied therewith. The program instructions are readable and/or executable by a processor to cause the processor to: perform the foregoing method.

A system, according to yet another embodiment, includes: a processor, and logic integrated with the processor, executable by the processor, or integrated with and executable by the processor. The logic is configured to: perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
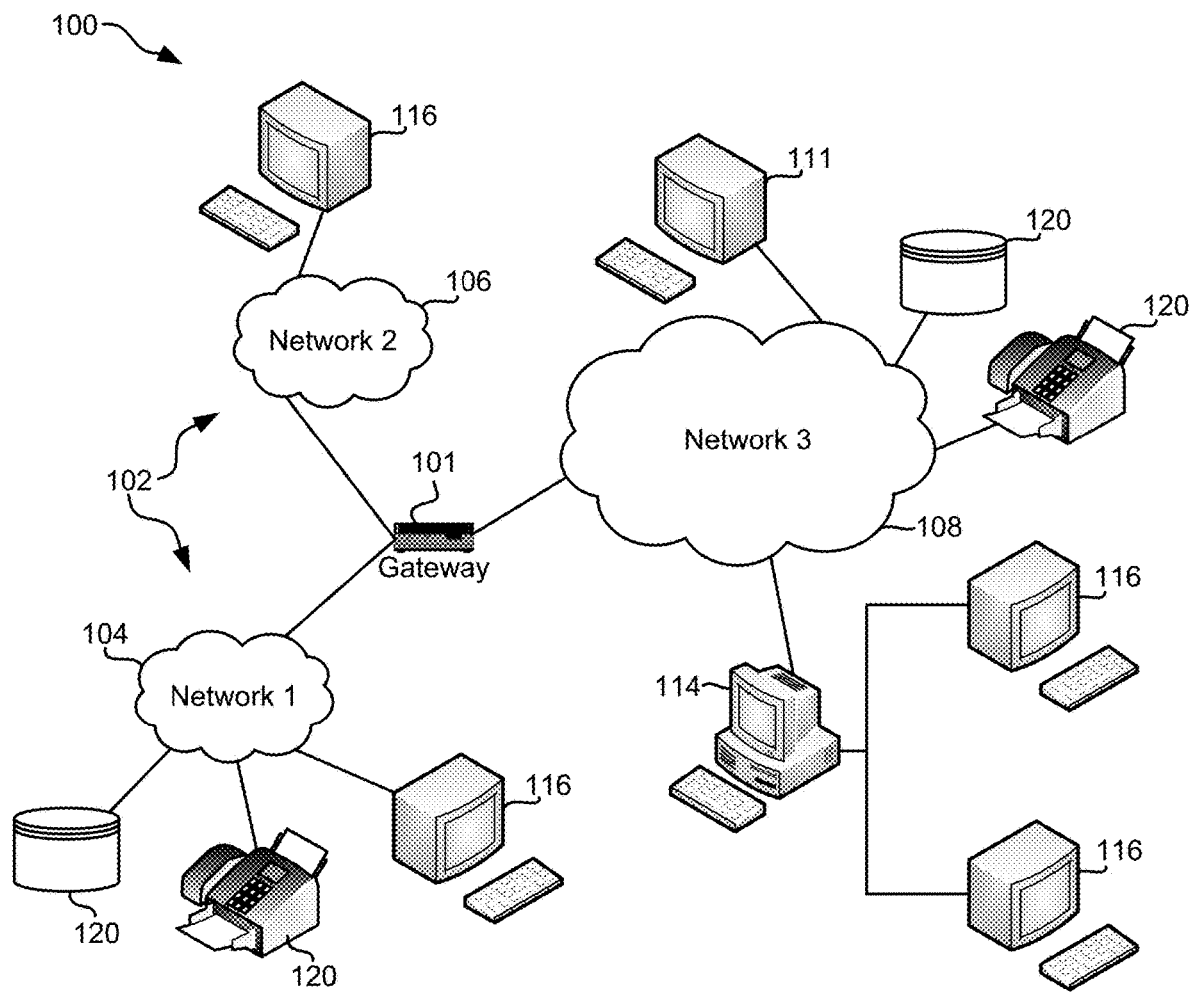
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for reducing the load that is experienced by the overarching storage network as a whole by selectively reducing the number of data operations that are performed. Moreover, various ones of the approaches described herein are able to achieve this improvement in performance without sacrificing the effectiveness at which the system operates (e.g., without compromising data retention), as will be described in further detail below.

In one general embodiment, a computer-implemented method includes: receiving a volume of data at a first cluster in a first tier of a tiered data storage system. The first tier of the tiered data storage system includes of a plurality of clusters, and the first cluster is coupled to a secondary storage in a second tier of the tiered data storage system. A determination is made as to whether any of the remaining clusters in the first tier are designated as copy target locations for the volume. In response to determining that one or more of the remaining clusters in the first tier are designated as a copy target location for the volume, for each of the one or more clusters designated as a copy target location for the volume: a determination is made as to whether the given cluster is coupled to the secondary storage. Moreover, in response to determining that the given cluster is not coupled to the secondary storage, a copy of the volume is sent to the given cluster.

In another general embodiment, a computer program product includes a computer readable storage medium having program instructions embodied therewith. The program instructions are readable and/or executable by a processor to cause the processor to: perform the foregoing method.

In yet another general embodiment, a system includes: a processor, and logic integrated with the processor, executable by the processor, or integrated with and executable by the processor. The logic is configured to: perform the foregoing method.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
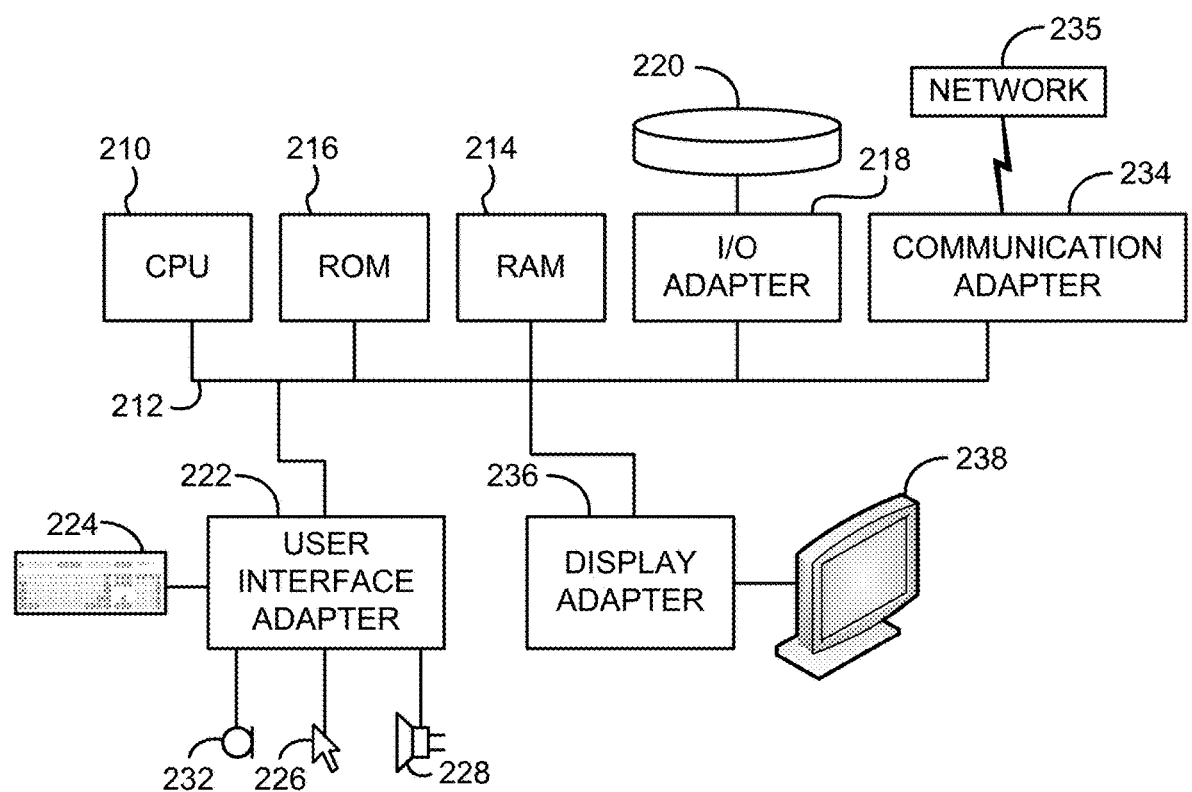
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
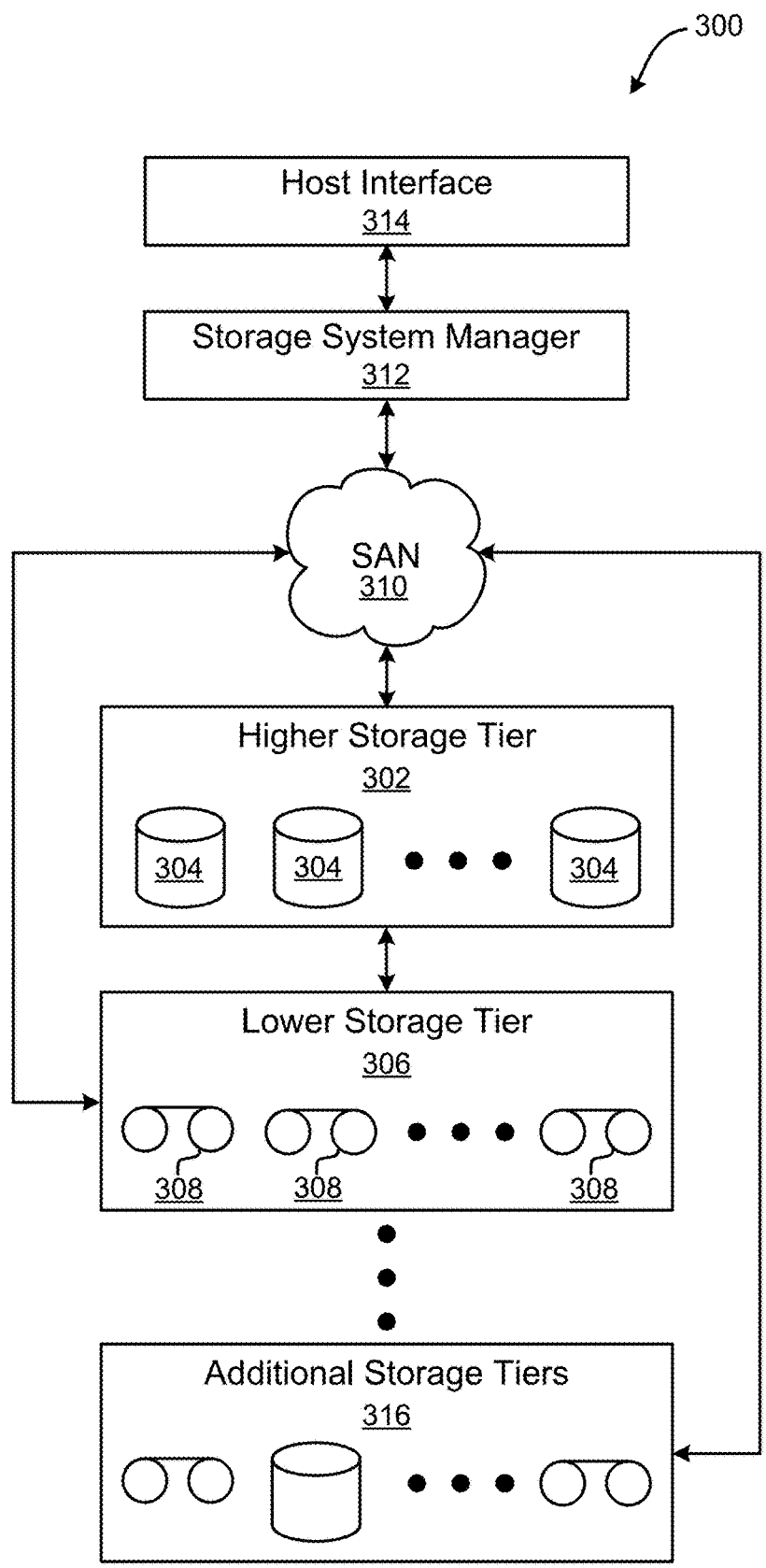
FIG. 3 is a partial representational view of a tiered data storage system, in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, multiple storage devices such as those depicted in the tiered data storage system 300 of FIG. 3 are implemented in an effort to maintain one or more redundant copies of data and increase data retention. These redundant copies of the data are particularly useful in situations where an acting primary storage location becomes unavailable and/or experiences data loss. In some situations, recovery storage locations are even able to assume operational responsibility in response to determining that the primary storage location is unable to. However, it should also be noted that the different levels of performance associated with each of the storage locations are reflected in their respective monetary prices (e.g., purchase price, upkeep costs, etc.). For instance, a primary storage location typically includes higher performance storage while the recovery storage locations typically include lower performance storage, e.g., at least with respect to each other. It follows that data which is accessed more frequently may be migrated to the primary storage location such that the higher performance storage may be utilized, while data that is access less frequently may be migrated to the recovery storage locations. This achieves a desirable balance of data processing performance and cost.

However, conventional data replication systems have experienced some performance setbacks in terms of implementing user I/O requests across multiple storage devices. In such conventional systems, a primary storage location forwards all I/O requests received from the users to the second storage location for implementation. While it does tend to improve data retention, this data storage scheme experiences a notable increase in processing overhead as a result of satisfying the additional I/O requests. Again, each of the I/O requests are transferred between each of the locations, thereby introducing performance delays which further increase as the number of storage locations implemented increase.

Moreover, a failure event experienced at any of the locations in conventional data replication systems and/or the connections extending therebetween disrupts the transfer of I/O requests therebetween and results in more than one copy of data to become out-of-synch. In turn, this must be remedied before the system returns to being operational, thereby introducing additional performance delays. However, the manner in which the data becomes out-of-synch and the area that it extends to varies depending on when and where the failure event is experienced. This increases the complexity of the recovery process. For example, all I/O requests which are inflight when a failure event occurs are repeated at all locations once the failure has been remedied.

In sharp contrast to the aforementioned shortcomings experienced by conventional data replication systems, various ones of the approaches included herein are able to efficiently maintain more than one copy of data across more than one data storage location. Accordingly, I/O requests received from a user (e.g., host) are implemented across the data storage locations in a manner which remedies the performance delays which have plagued conventional systems, also without compromising data retention, e.g., as will be described in further detail below.

Figure 4A:
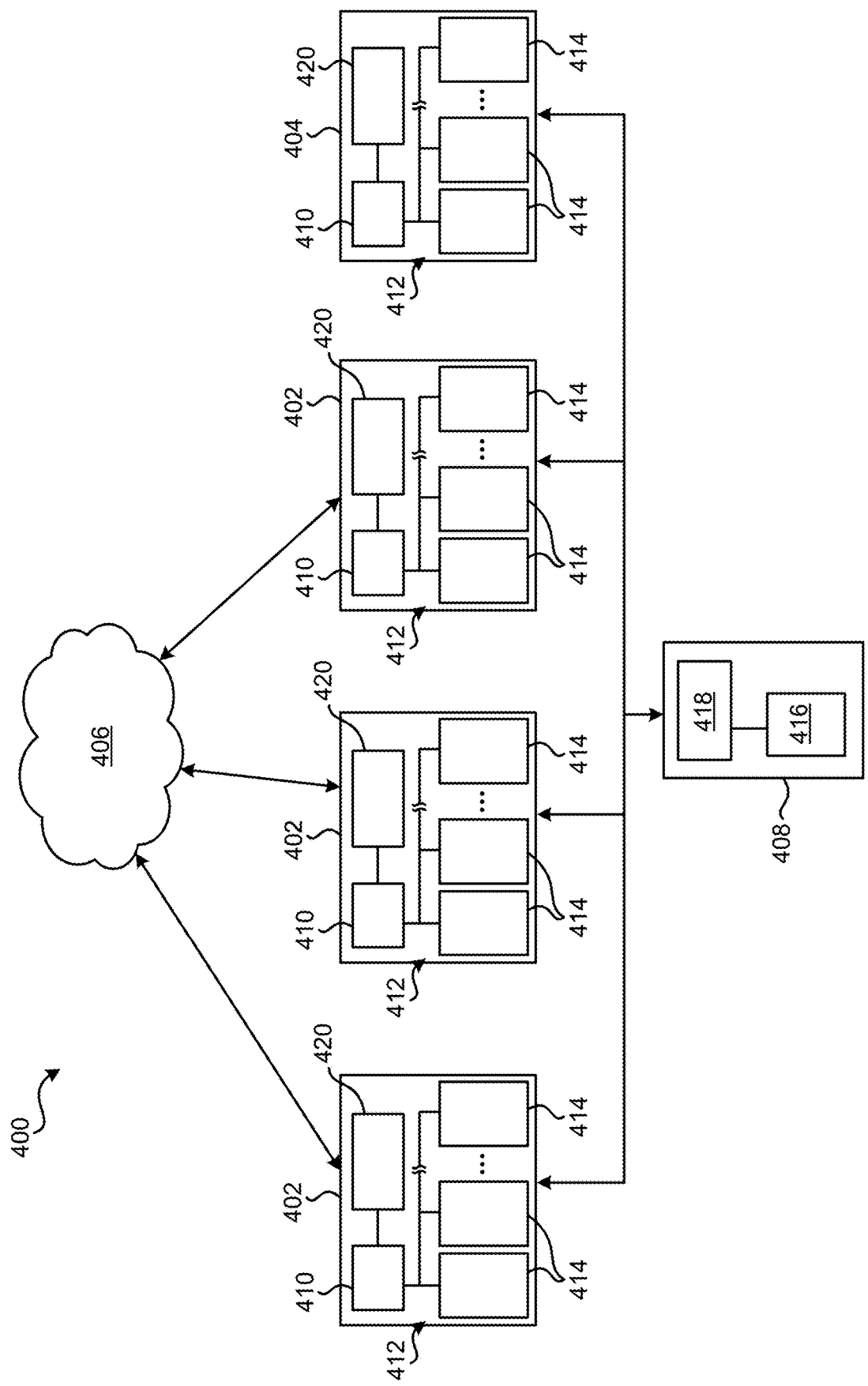
FIG. 4A is a partial representational view of a distributed data storage system, in accordance with one embodiment.

Looking to FIG. 4A, a distributed data storage system 400 is illustrated in accordance with one approach. As an option, the present distributed data storage system 400 may be implemented in conjunction with features from any other approach listed herein, such as those described with reference to the other FIGS. However, such distributed data storage system 400 and others presented herein may be used in various applications and/or in permutations which may or may not be specifically described in the illustrative approaches listed herein. Further, the distributed data storage system 400 presented herein may be used in any desired environment. Thus FIG. 4A (and the other FIGS.) may be deemed to include any possible permutation.

Figure 4B:
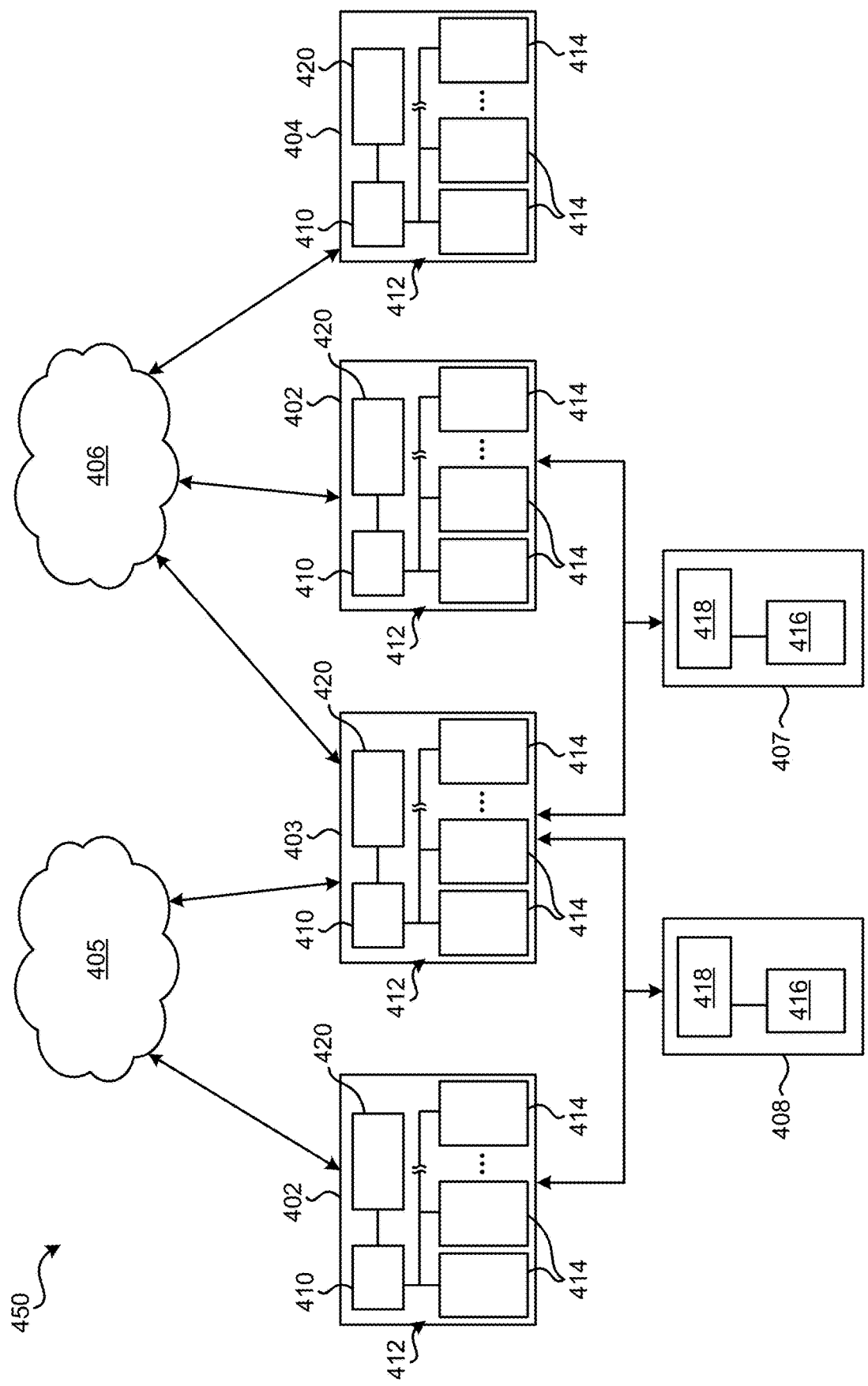
FIG. 4B is a partial representational view of a distributed data storage system, in accordance with one embodiment.

As show, the distributed data storage system 400 includes a number of primary data storage clusters 402, 404, each of which are connected to a host 408. Some of the primary data storage clusters 402 are also connected to a network computing environment 406. However, it should be noted that the architecture depicted in data storage system 400 of FIG. 4A and/or the specific components included therein are in no way intended to limit the invention. For instance, FIG. 4B illustrates an alternative communication configuration for the various components that are included therein, e.g., as will be described in further detail below.

In preferred approaches the network computing environment 406 is actually a cloud computing environment (e.g., see 750 of FIG. 7) which functions as a secondary data storage option for the system 400. However, in other approaches the network computing environment 406 may be any type of network, e.g., such as a WAN (such as the Internet), a LAN, a PSTN, a SAN, an internal telephone network, etc. It follows that the primary data storage clusters 402, 404 are able to communicate with each other, the network computing environment 406 and/or the host 408 regardless of the amount of separation which exists therebetween, e.g., despite being positioned at different geographical locations.

Each of the primary data storage clusters 402, 404 include a controller 410 (e.g., processor) which is coupled to a memory array 412. As shown, the host 408 also includes a controller 416 (e.g., processor) which is further coupled to memory 418 that may be used to at least temporarily store information (e.g., such as data, I/O requests, metadata, etc.) in a queue. The primary data storage clusters 402, 404 also include a queue 420 which may be used to store data. In some approaches, a queue 420 may be used to store data that is intended to be copied to another storage location in the system 400. Although a given storage cluster may be designated as a target location for data (e.g., a volume), the given storage cluster may further be instructed to transmit additional copies of the data to other ones of the clusters and/or the network computing environment 406 itself. Accordingly, the queue 420 may be used to organize and/or store copies of data that are to be transmitted to other storage locations, e.g., as will be described in further detail below.

Depending on the approach, the memory array 412 included in each of the primary data storage clusters 402, 404 may include different types of storage components 414. For instance, the memory array 412 in the first primary data storage clusters 402 includes higher performance storage components than those included in the second primary data storage cluster 404 in some approaches. It should be noted that in terms of the present description, "higher performance" may be measured with respect to achievable throughput, performance delays, reliability factors, etc. For example, the memory array 412 in the first primary data storage clusters 402 may include SSDs, while the memory array 412 in the second primary data storage cluster 404 includes HDDs.

In some approaches, the majority of the storage components 414 implemented in the primary data storage clusters 402, 404 include higher performance storage components in comparison to the majority of those that are included in the network computing environment 406. In other words, the primary data storage clusters 402, 404 may be considered as being a somewhat higher performance tier of the data storage system 400, while the network computing environment 406 serves as a somewhat lower performance tier of the same system 400. This allows for host I/O requests to be received and processed efficiently by the higher performance primary data storage clusters 402, 404, while certain I/O requests and/or other data processing operations may be transferred to the network computing environment 406 by the primary data storage clusters 402 that are coupled thereto. According to another example, which is in no way intended to limit the invention, the storage components 414 implemented in the primary data storage clusters 402, 404 may include SSDs and/or HDDs, while the storage components that are included in the network computing environment 406 may include magnetic tapes which are accessed using magnetic tape drives.

Referring momentarily now to FIG. 4B, an alternative distributed data storage system 450 is illustrated in accordance with one approach. As mentioned above, the distributed data storage system 450 of FIG. 4B illustrates alternative communication configuration for the various components that are included in storage system 400 of FIG. 4A. Accordingly, various components of FIG. 4B have common numbering with those of FIG. 4A.

As show, the distributed data storage system 450 includes a number of primary data storage clusters 402, 403, 404, some of which are connected to a host 408, 407. Specifically, two of the primary data storage clusters 402, 403 are connected to a first host 408, while two primary data storage clusters 403, 402 are connected to a second host 407. Although each of primary data storage clusters 402 are connected to a single host, and primary data storage cluster 403 is connected to both of the hosts 408, 407, primary data storage cluster 404 is not connected to either of the hosts.

However, each of the primary data storage clusters 402, 403, 404 are connected to one of the network computing environments 405, 406. In preferred approaches the network computing environments 405, 406 are actually cloud computing environments (e.g., see 750 of FIG. 7) which function as a secondary data storage option for the system 450. However, in other approaches, either of the network computing environments 405, 406 may be any type of network, e.g., such as a WAN (such as the Internet), a LAN, a PSTN, a SAN, an internal telephone network, etc.

Once again, it follows that various ones of the approaches included herein are able to efficiently maintain more than one copy of data across more than one data storage location. Accordingly, the distributed data storage systems 400, 450 and the components included therein are desirably able to reduce the processing load experienced as a whole by reducing the number of data replications that are performed therein, e.g., as will be described in further detail below.

Figure 5:
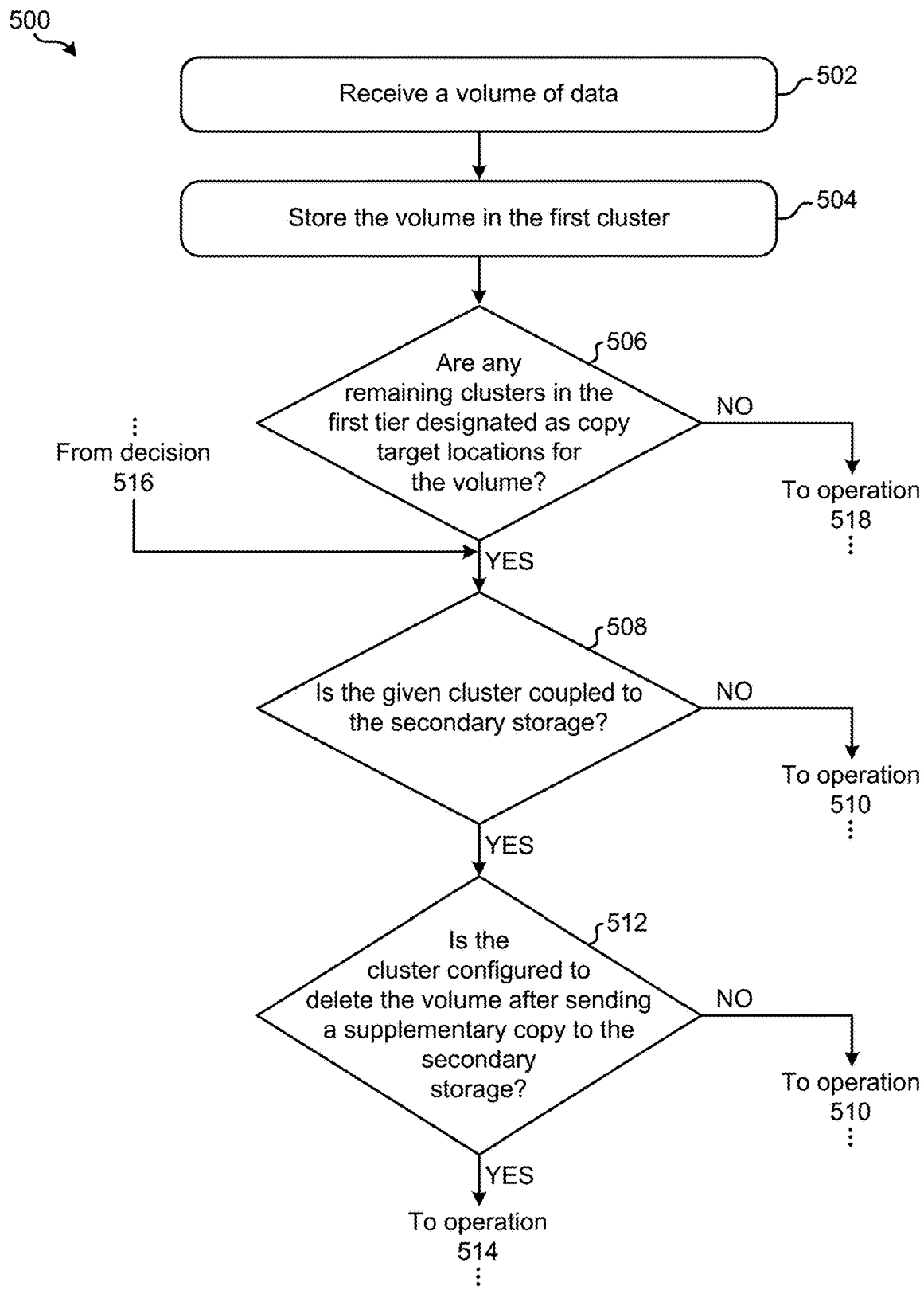
FIG. 5 is a flowchart of a method, in accordance with one embodiment.
Figure 5:
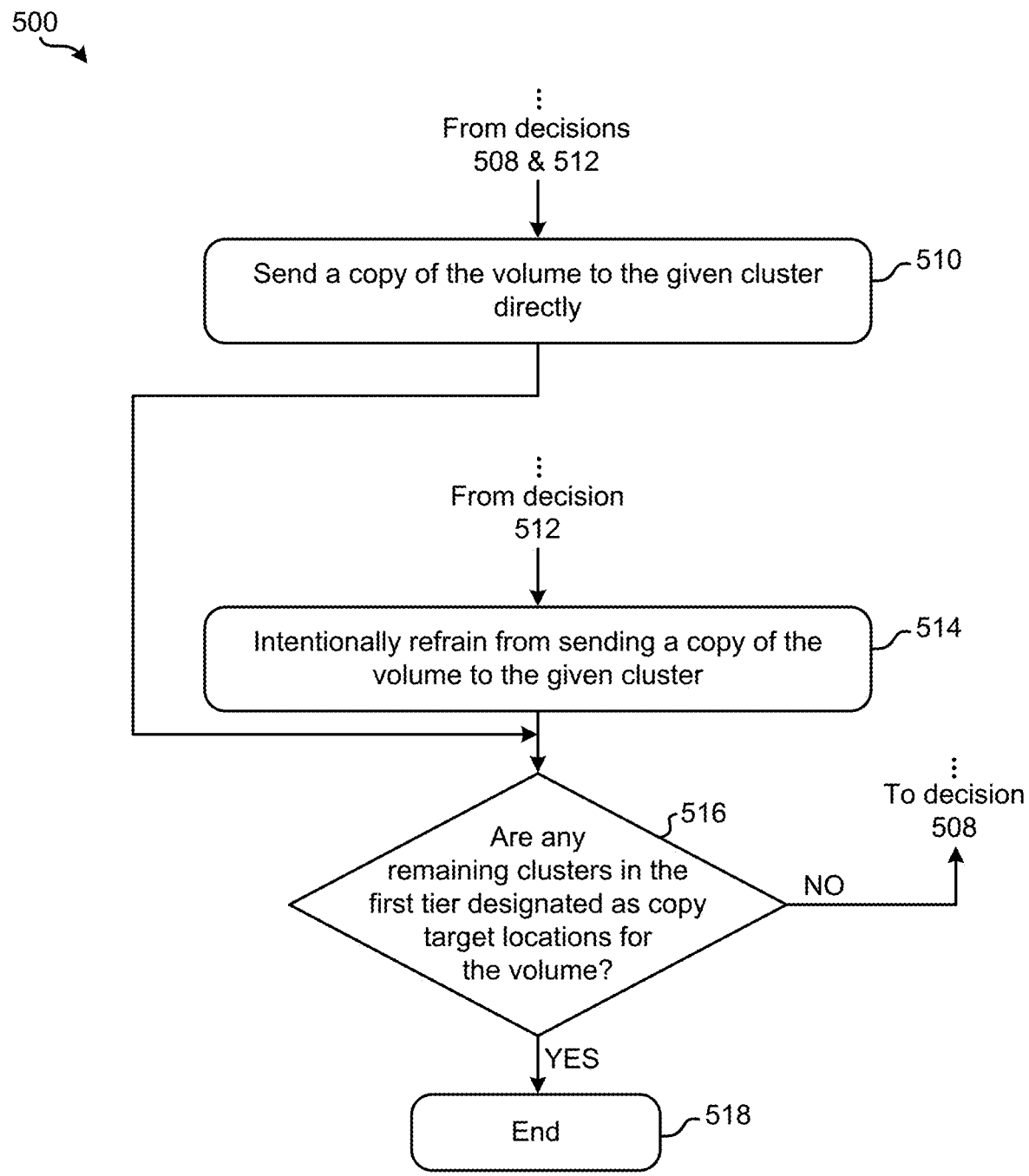

For instance, looking now to FIG. 5, a flowchart of a computer-implemented method 500 for processing write requests across more than tier of a tiered data storage system is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in preferred embodiments the method 500 is at least partially performed by a controller in a first primary data storage cluster (e.g., see 410 of FIG. 4A and/or FIG. 4B above). Accordingly, the various processes included in method 500 have been described in the context of being performed by a "first cluster" in a "first tier", which is in no way intended to limit the invention. For instance, in various other embodiments, the method 500 may be partially or entirely performed by a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, operation 502 of method 500 includes receiving a volume of data to store at a first cluster in a first tier of a tiered data storage system. As noted above, I/O requests may be received by a primary data storage cluster in a given tier of a storage system from a host in some approaches. While the given tier of the storage system may include a plurality of different clusters therein, it is preferred that the volume of data is received by a primary data storage cluster which is coupled to a secondary (e.g., backup) storage in a second tier of the tiered data storage system. According to an example, which is in no way intended to limit the invention, operation 502 and/or any of the other processes included in method 500 may be performed by one of the primary data storage clusters 402 of FIG. 4A and/or FIG. 4B above.

In some approaches, the cluster in the primary storage identified as having a greatest amount of unused space in its respective queue may be designated to receive and process volumes of data from the host. As previously mentioned, each of the clusters in a primary storage may include a queue which can be used to store volumes that are intended to be copied to a secondary storage (e.g., see 420 of FIG. 4A and/or FIG. 4B above). The cluster having a greatest amount of unused space in its respective queue may thereby be best suited to process received volumes of data. However, in other approaches a cluster identified as having a highest performance, a greatest health metric, a least amount of data stored therein, etc., may be designated to process received volumes of data. It follows that a volume of data may be received by a different one of the clusters in a primary storage depending on the current status of the storage system and the various clusters that are included therein.

Returning to FIG. 5, it follows that operation 502 may include receiving a volume of data from a host to store in the first cluster. However, in other approaches the volume of data may be received from another storage system, a running application, another storage controller, etc. It should also be noted that the volume may be of any desired type, e.g., depending on how the tiered data storage system is designed. For instance, in some approaches the volume may simply be a logical file which includes any desired type of information, e.g., such as data, metadata, etc. In other approaches the volume may be an object, an arbitrary grouping of data, etc.

Proceeding to operation 504, method 500 includes storing the volume in the first cluster. In other words, operation 504 includes satisfying a write request which corresponds to the received volume of data. Storing the volume in the first cluster may be performed using any write procedures which correspond to the given type of data storage components and which would be apparent to one skilled in the art after reading the present description.

Moreover, decision 506 includes determining whether any of the remaining clusters in the first tier are designated as copy target locations for the volume. Again, multiple copies of data may be stored in a given system for a number of reasons. In some instances, more than one copy of data may be stored in a same storage system in an effort to increase data retention, while in other instances the multiple copies of the same data may be stored in order to reduce data access times.

Regardless of the motivation to store multiple copies of data, copy target locations for the volume may be used to identify where the additional copies of the volume are to be stored in the system. For example, a second one of the primary data storage clusters may be designated as a copy target location for the volume. It follows that a second copy of the volume is preferably stored at the second one of the primary data storage clusters. According to another example, a storage location in a different tier of the storage system may be designated as a copy target location for the volume. For instance, referring back momentarily to FIG. 4A, although one or more copies of the volume may be stored on one or more of the primary data storage clusters 402, 404, the network computing environment 406 may also be designated as copy target locations for the volume. Accordingly, an additional copy of the volume may be stored in the network computing environment 406, e.g., as will be described in further detail below.

Returning again to method 500, in response to determining that one or more of the other (e.g., remaining) clusters in the first tier are designated as a copy target location for the volume, each of the one or more clusters designated as a copy target location for the volume are preferably evaluated in the context of how the volume is intended to be stored. In other words, each of the copy target locations are preferably evaluated to determine an efficient way in which the given volume may be distributed and stored in memory. For instance, evaluating the copy target locations for a given volume may reveal information that can be used to determine whether certain copy target locations are redundant, e.g., as will soon become apparent.

Method 500 proceeds from decision 506 directly to operation 518 in response to determining that none of the other clusters in the first tier are designated as a copy target location for the volume. Upon reaching operation 518, method 500 may end. However, it should be noted that although method 500 may end upon reaching operation 518, any one or more of the processes included in method 500 may be repeated in order to process subsequently received volumes.

Returning to decision 506, method 500 proceeds to decision 508 in response to determining that one or more of the other clusters in the first tier are designated as a copy target location for the volume. There, decision 508 includes determining whether the given cluster is coupled to the secondary storage. As noted above, a number of storage locations may be coupled to a secondary storage which serves as a backup storage location. According to an example, which is in no way intended to limit the invention, at least some of the clusters in the first tier may be coupled to a cloud storage environment which is configured to store redundant copies of certain data. These redundant copies of data may be used to rebuild a cluster that has experienced a data loss event, satisfy an I/O request, update other portions of existing data, etc., depending on the approach.

It follows that in some situations, clusters which are coupled to a secondary storage may not actually need to store a copy of data that is maintained in the secondary storage, e.g., in the interest of conserving storage capacity. However, a cluster which is only coupled to a host and not the secondary storage is not able to rely on the backup copies of data that are stored in the secondary storage. For example, referring momentarily back to FIG. 4A, while clusters 402 are coupled to both the host 408 and the network computing environment 406, cluster 404 is not coupled to the network computing environment 406. Accordingly, while clusters 402 are able to access backup copies of data stored on the network computing environment 406, cluster 404 only has access to the data that is stored in its respective memory array 412.

Accordingly, returning FIG. 5, method 500 proceeds from decision 508 to operation 510 in response to determining that the given cluster is not coupled to the secondary storage. There, operation 510 includes sending a copy of the volume to the given cluster directly. This allows for the given cluster to store a copy of the volume therein as specified by the copy target locations associated with the volume. The copy of the volume may be sent to the given cluster in a number of different ways depending on the architecture of the overarching storage system. For instance, in some approaches the two clusters may be connected by a physical electrical connection, whereby a copy of the volume may be sent therebetween using a wired connection, e.g., a cable, a fiber-optic link, a wire, etc. In other approaches, the two clusters may be connected wirelessly, whereby a copy of the volume may be sent therebetween using a wireless connection, e.g., WiFi, Bluetooth, a cellular network, etc. However, any other type of connection which would be apparent to one skilled in the art after reading the present description may be used to send the copy of the volume to the given cluster.

From operation 510, method jumps to decision 516 which determines whether each of the clusters designated as a copy target location for the volume have been evaluated. In response to determining that at least one of the clusters designated as a copy target location for the volume has not yet been evaluated, method 500 returns to decision 508. It follows that processes 508-516 may be repeated in an iterative fashion for each of the clusters that are designated as a copy target location for the volume.

Returning to decision 508, method 500 proceeds to decision 512 in response to determining that the given cluster is coupled to the secondary storage. There, decision 512 includes determining whether the given cluster is configured to delete a copy of the volume stored therein after sending a supplementary copy of the volume to the secondary storage. For instance, some data storage policies specify that more than one copy of a volume are to be stored at different clusters of a primary storage scheme. Some of these clusters are further instructed to send an additional copy of the volume to a secondary storage, e.g., to create a redundant copy of the data which is also stored at a location which is removed from the clusters of the primary storage. Accordingly, each of the clusters in a primary storage may include a queue which can be used to store volumes that are intended to be copied to a secondary storage (e.g., see 420 of FIG. 4A and/or FIG. 4B above). As previously mentioned, a cluster determined as having a greatest amount of unused space in its respective queue may be designated to process volumes of data that are received.

After the additional copy of the volume has been sent to the secondary storage by a given cluster that has been instructed to do so, the cluster may either retain the copy of the volume that is stored in the cluster's memory, or delete it. It follows that although a given cluster may initially be designated as a copy target location for the volume, that does not necessarily mean that the volume will remain stored at the given cluster. This distinction may be determined based on the data storage policy which is implemented. For example, a first data storage policy may specify that upon completion of premigration of a volume from a cluster on a primary storage to a secondary storage, the copy of the volume stored on the primary storage is deleted as soon as possible. However, a second data storage policy may specify that even after a copy of a volume has been premigrated to a secondary storage from a cluster in the primary storage, the copy of the volume stored on the primary storage may be retained in memory as long as the capacity of the primary storage permits. It should further be noted that the aforementioned first data storage policy may be applied by clusters in the primary storage which are connected to the secondary storage, while the second data storage policy is implemented by clusters which are not connected to the secondary storage.

With continued reference to FIG. 5, in response to determining that the given cluster is not configured to delete a copy of the volume stored therein after sending a supplementary copy of the volume to the secondary storage, method 500 proceeds to operation 510. As noted above, operation 510 includes sending a copy of the volume to the given cluster directly. In other words, because it is determined that the copy of the volume sent to the other one of the clusters will actually be maintained in that cluster, rather than simply as a part of an overarching procedure to store a supplementary copy of the volume at a secondary storage, method 500 is able to distinguish unnecessary data transfer operations from legitimate ones.

This ability to distinguish between data transfer operations allows for method 500 to selectively ignore certain data transfer operations and consequently improve efficiency of the storage system as a whole. Accordingly, in response to determining that the given cluster is configured to delete a copy of the volume stored therein after sending a supplementary copy of the volume to the secondary storage, method 500 alternatively advances to operation 514. There, operation 514 includes intentionally not sending a copy of the volume to the given cluster, despite the fact that the given cluster is designated as copy target location for the volume.

In other words, a copy of the volume is not sent to the given cluster in response to determining that the given cluster is configured to delete the received copy of the volume after sending a supplementary copy of it to the secondary storage. Moreover, because the given cluster is connected to the same secondary storage as the cluster which initially received the volume of data, even if a supplementary copy of the volume is to be stored at the secondary storage, the cluster which initially received the volume of data is able to send the supplementary copy of the volume directly. This avoids superfluous data operations, thereby causing system efficiency to increase dramatically as a result of reducing processing overhead.

With continued reference to FIG. 5, method proceeds to decision 516 from operation 514, and determines whether each of the clusters designated as a copy target location for the volume have been evaluated. As noted above, method 500 returns to decision 508 in response to determining that at least one of the clusters designated as a copy target location for the volume has not yet been evaluated, e.g., such that various ones of processes 508-516 may be repeated for another one of the clusters that are designated as a copy target location for the volume. Returning momentarily to decision 516, method 500 alternatively proceeds to operation 518 in response to determining that each of the clusters designated as a copy target location for the volume have been evaluated. As noted above, method 500 may end upon reaching operation 518.

It follows that various ones of the processes included in method 500 are able to reduce the load that is experienced by the overarching storage network as a whole by selectively reducing the number of data operations that are performed. Moreover, the processes described above are able to achieve this improvement in performance without sacrificing the effectiveness at which the system operates (e.g., without compromising data retention).

It should also be noted that each cluster in a primary storage has database storing information about all the volumes in the domain. Moreover, the databases of the clusters are preferably synchronized with each other, thereby allowing for each cluster to be aware of where each volume is stored in the system. Any one of the clusters in the primary storage may also be able to perform the various processes included in method 500, although it is preferred that the processes are performed by a cluster which is at least connected to a secondary storage (e.g., such as cloud storage). This allows for the cluster performing the processes to premigrate a volume to the secondary storage without relying on one of the other clusters, thereby improving performance as described above.

According to a simple example, it may be assumed that C2 and C4 are two clusters which are connected to a same cloud storage. Moreover, each of the clusters C2, C4 have a copy of the volume in their respective memory. Thus, if cluster C2 was able to successfully copy the volume to the cloud storage, the other cluster C4 (which is also connected to the cloud storage) need not send another copy of the same volume to the cloud storage. Thus, by preventing cluster C4 from sending an additional copy of the volume to the cloud storage, it is possible to reduce load of grid network among clusters.

It follows that some of the approaches included herein depend on whether the clusters are connected to a shared secondary storage, as well as the data storage policy that is implemented. It is also preferred that load balancing is considered when selecting a cluster to receive a volume and/or perform any one or more of the processes that are described herein, e.g., in order to avoid failure events.

While the approaches herein were described under the assumption that the clusters in a domain have about the same function without having different operation attributes, e.g., such as active and/or passive settings, and without having special roles, e.g., such as a control node. It is also preferred that a data copy operation implemented to copy a volume to one or more clusters is scheduled as soon as possible after the volume is created.

Figure 6A:
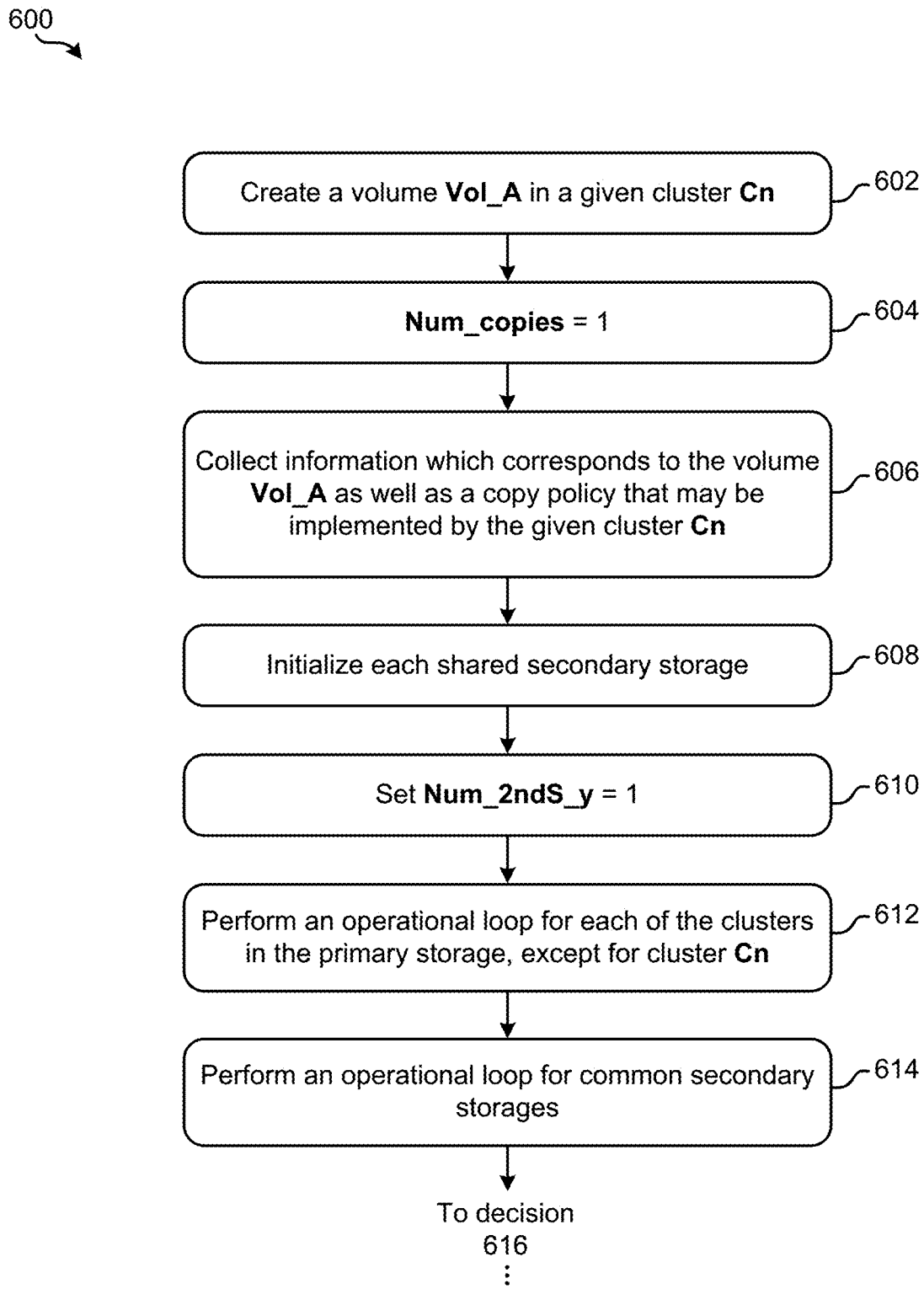
FIG. 6A is a flowchart of a method, in accordance with one embodiment.
Figure 6A:
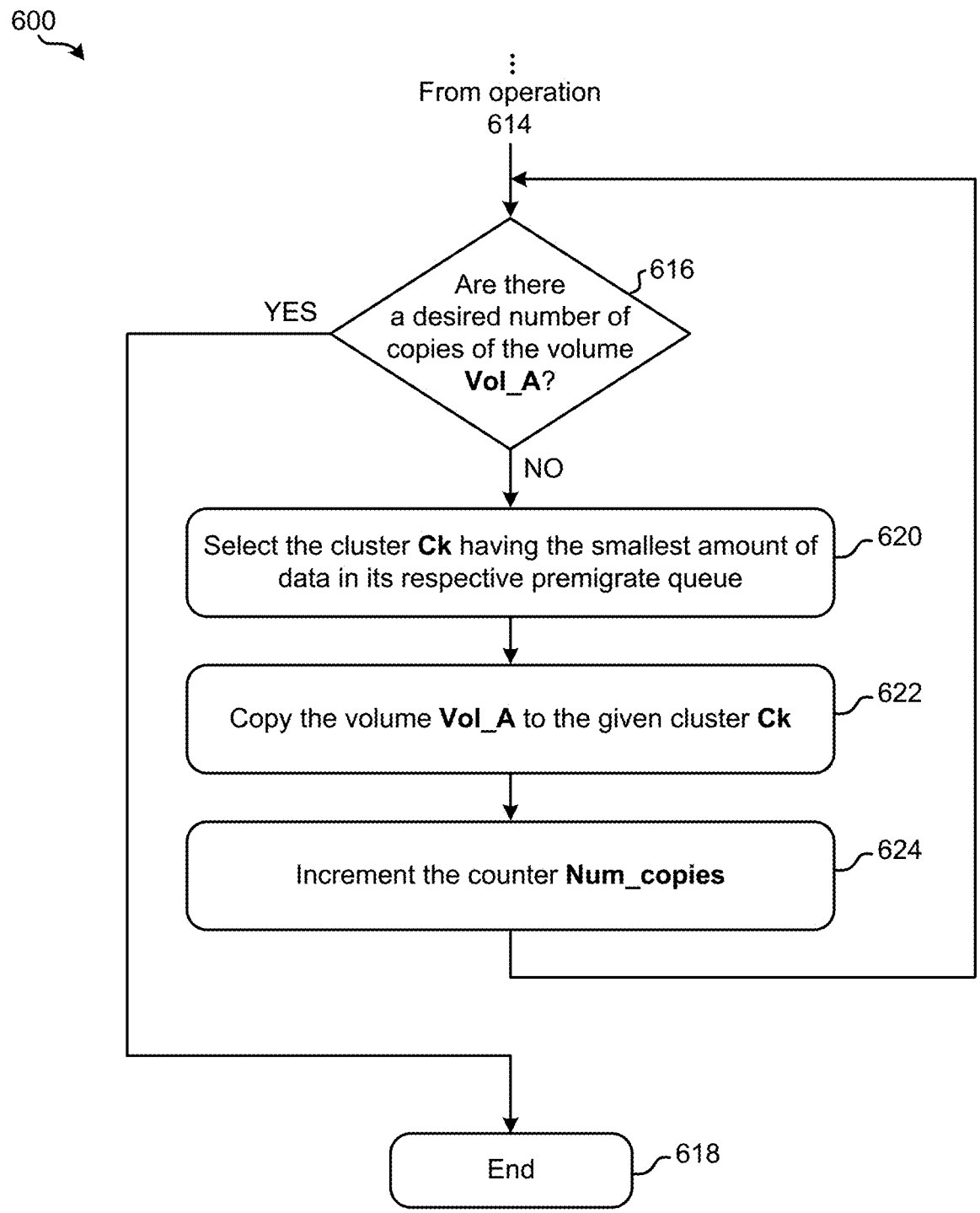

Looking now to FIG. 6A, a method 600 for processing a received volume of data is illustrated in accordance with an in-use example, which is in no way intended to limit the invention. As shown, operation 602 involves creating a volume Vol_A in a given cluster Cn, wherein "n" may be 1, 2, 3, 4, 5, 6, 7, or 8. With respect to the present description, the volume Vol_A is created in the given cluster Cn as a result of receiving the volume in some approaches, while in other approaches the volume may be created in any desired manner.

Operation 604 includes setting a counter Num_copies which corresponds to the number of copies of the volume Vol_A exist in the system. As shown, the counter Num_copies is set equal to 1 because operation 602 created the first copy of the volume. Moreover, operation 606 includes collecting information which corresponds to the volume Vol_A as well as a copy policy that may be implemented by the given cluster Cn. According to an illustrative example, which is in no way intended to limit the invention, the copy policy that is implemented by the given cluster Cn may be copy policy "Y" or copy policy "N". Copy policy Y may indicate that the given cluster is to receive a copy of a volume regardless of whether the cluster is part of the primary or secondary storage. Accordingly, the given cluster may be used from any host to access the volume. However, copy policy N may indicate that the host does not expect that the cluster has the copy of the volume, and therefore the host will not use the given cluster to access the volume.

In some approaches, the information which is collected may be indicative of (for each cluster) the secondary storage type, the handling modes of the volume Vol_A (e.g., copy policy and preference group), the amount of premigrations which have accumulated in a queue of the given cluster Cn for migration to the secondary storage, etc. With respect to the present description, it should be noted that "preference group" refers to a predetermined manner in which the copy of a given volume will be managed. For example, preference group "PG0" may indicate that a copy of Vol_A in primary storage will be deleted as soon as possible after it has been copied to the secondary storage. According to another example, preference group "PG1" may indicate that a copy of Vol_A in primary storage is retained in the primary storage as long as possible, e.g., even after it has been copied to the secondary storage. Moreover, referring momentarily to FIG. 6B, table 650 depicts some of the types of information that may be collected in operation 606.

Proceeding to operation 608, each shared secondary storage is initialized. According to the present in-use example, i=A and B, where 2ndS_C is not a shared secondary storage according to the information included in table 650. Moreover, Num_2ndS_y indicates number of clusters that have copy of Vol_A and that connect with each secondary storage 2ndS_y, where y may be A, B, or C in the present in-use example. Each of these variables are also preferably initialized to 0.

Operation 610 further includes setting Num_2ndS_y=1 in response to determining that Cn is actually connected to the secondary storage 2ndS_y. According to the present in-use example, if n is 1, 2, 3, or 4, y is set equal to A, while if n is 5, 6, or 7, y is set equal to B. Furthermore, if n is 8, y is set equal to C. This is due, in part, to the fact that the cluster Cn already has a copy of volume Vol_A.

Figures 6B, 6C:
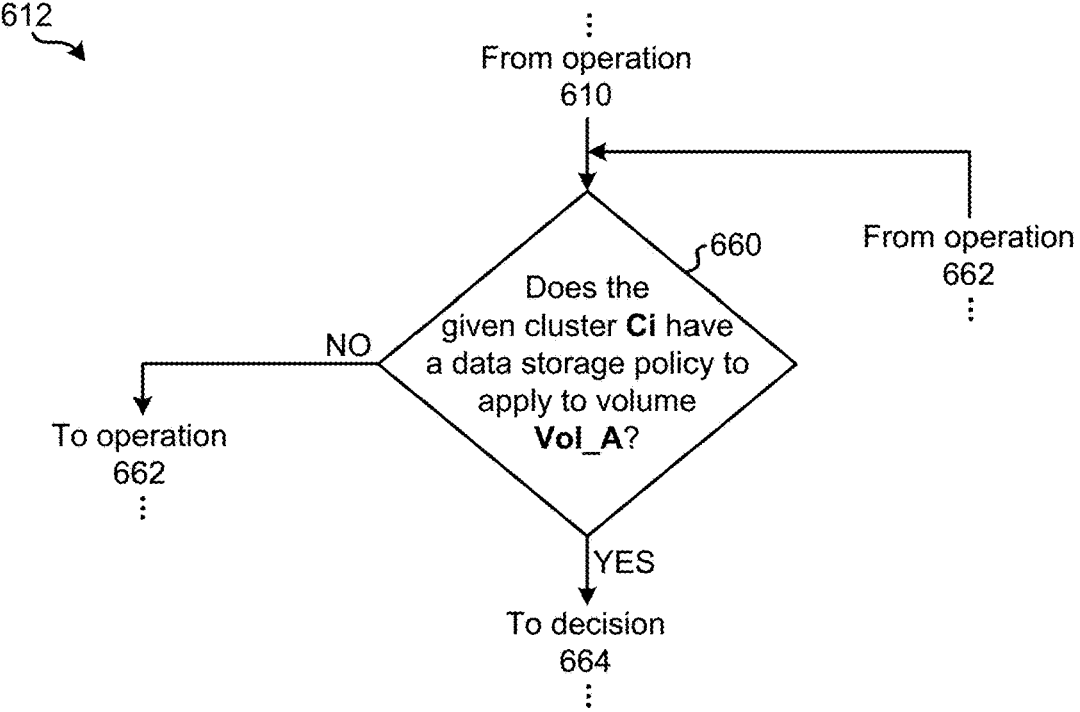
FIG. 6B is a table of collected information which corresponds to a volume, in accordance with one embodiment.
FIG. 6C is a flowchart of sub-processes for one of the operations in the method of FIG. 6A, in accordance with one embodiment.
Figure 6C:
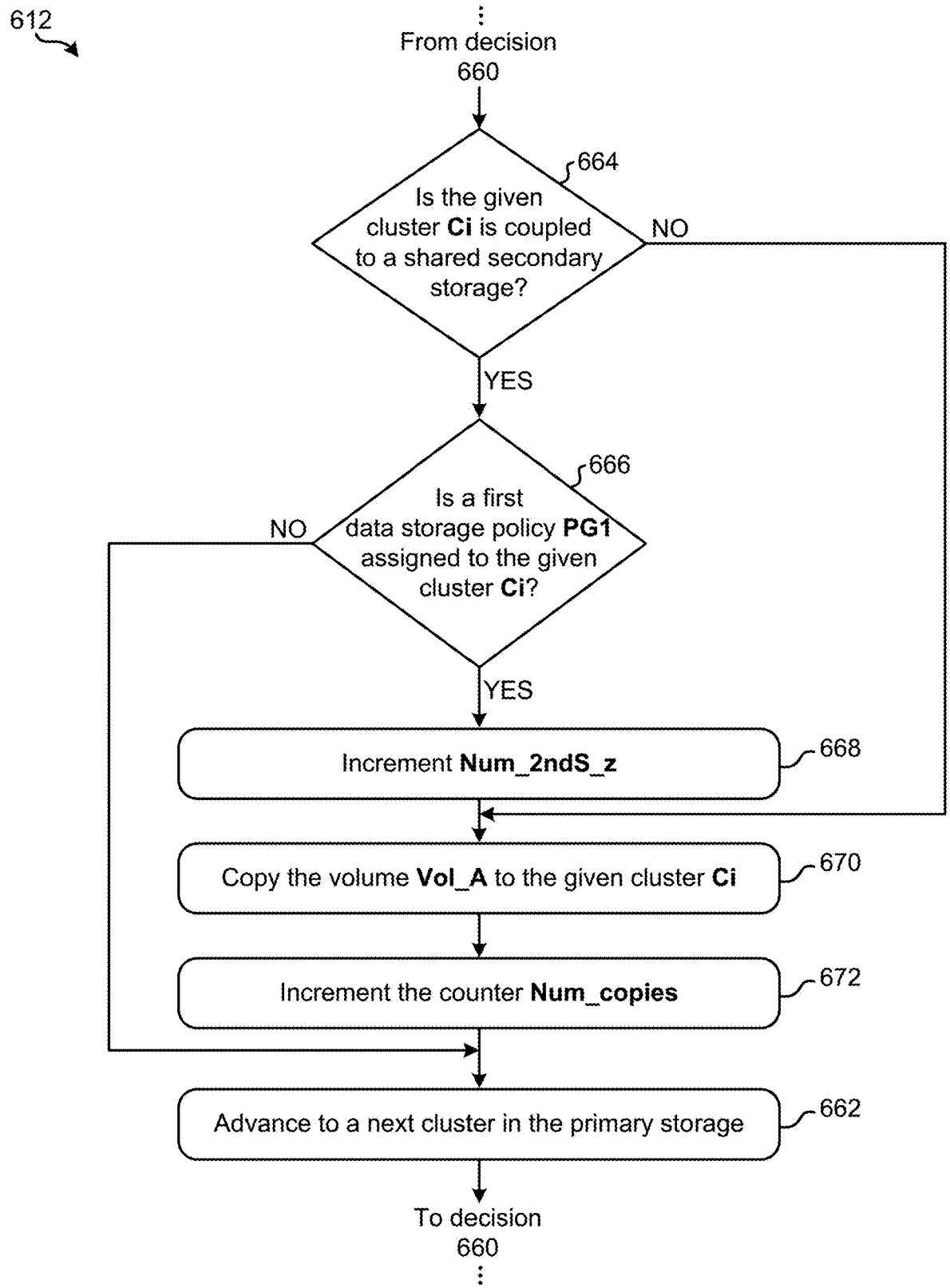

Moreover, operation 612 includes performing an operational loop for each of the clusters in the primary storage, except for cluster Cn. This operational loop is able to execute copy operations to clusters which are not connected with a shared cloud environment, as well as execute copy operations to clusters which have a preference group of PG1 for Vol_A, e.g., as described above. Looking now momentarily to FIG. 6C, exemplary sub-processes of performing the operational loop for each of the clusters are illustrated in accordance with one embodiment, one or more of which may be used to perform operation 612 of FIG. 6A. However, it should be noted that the sub-processes of FIG. 6C are illustrated in accordance with one embodiment which is in no way intended to limit the invention.

As shown, the flowchart first includes determining whether the given cluster Ci has copy policy "Y" for volume Vol_A. In the present in-use example, "i" is a loop index having a value of 1, 2, 3, 4, 5, 6, 7, or 8 depending on the iteration of the loop index. It should also be noted that the loop index skips over the iteration which corresponds to the same value as n. See decision 660. in response to determining that the given cluster Ci does not have copy policy "Y" for volume Vol_A, (e.g., cluster Ci has copy policy "N" for volume Vol_A) the flowchart proceeds to sub-operation 662, which includes advancing to a next cluster in the primary storage.

However, returning to decision 660, the flowchart proceeds to decision 664 in response to determining that the given cluster Ci does have a copy policy "Y" for volume Vol_A. There, decision 664 includes determining whether the given cluster Ci is coupled to a shared secondary storage (e.g., a cloud computing environment). This determination may be made based on the information which was collected in operation 606 of FIG. 6A. For example, looking back to table 650 in FIG. 6B, clusters C1, C2, C3, and C4 have shared secondary storage 2ndS_A, while clusters C6 and C7 have shared secondary storage 2ndS_B. However, cluster C8 is not connected to a shared secondary storage.

Returning to decision 664, the flowchart proceeds to decision 666 in response to determining that the given cluster Ci is coupled to a shared secondary storage. There, decision 666 includes determining whether the preference group assigned to the given cluster Ci is PG1. According to the present in-use example, PG1 corresponds to a scheme that involves maintaining a copy of the volume in the given cluster even after completing a premigration of the volume to the shared secondary storage.

In response to determining that the preference group assigned to the given cluster Ci is not PG1, the flowchart returns to sub-operation 662, e.g., as mentioned above. However, in response to determining that the preference group assigned to the given cluster Ci is PG1, the flowchart advances to sub-operation 668. There, sub-operation 668 includes incrementing Num_2ndS_z before proceeding to sub-operation 670. Here, "z" represents cloud A, B, or C which Ci is connected to (e.g., in communication with). It follows that if i=1, 2, 3, 4, 5, 6, 7, 8, then z would be equal to A, A, A, A, B, B, B, C, respectively.

As shown, sub-operation 670 includes actually copying the volume Vol_A to the given cluster Ci. Furthermore, sub-operation 672 includes incrementing the counter Num_copies to account for the newly created copy of the volume Vol_A formed in sub-operation 670, before returning to sub-operation 662. It follows that the sub-processes included in FIG. 6C are performed for all the clusters except for cluster Cn, and searches for clusters which do not have a common secondary storage, but do have a copy policy. The sub-processes also search for clusters which have PG1 applied thereto.

Figure 6D:
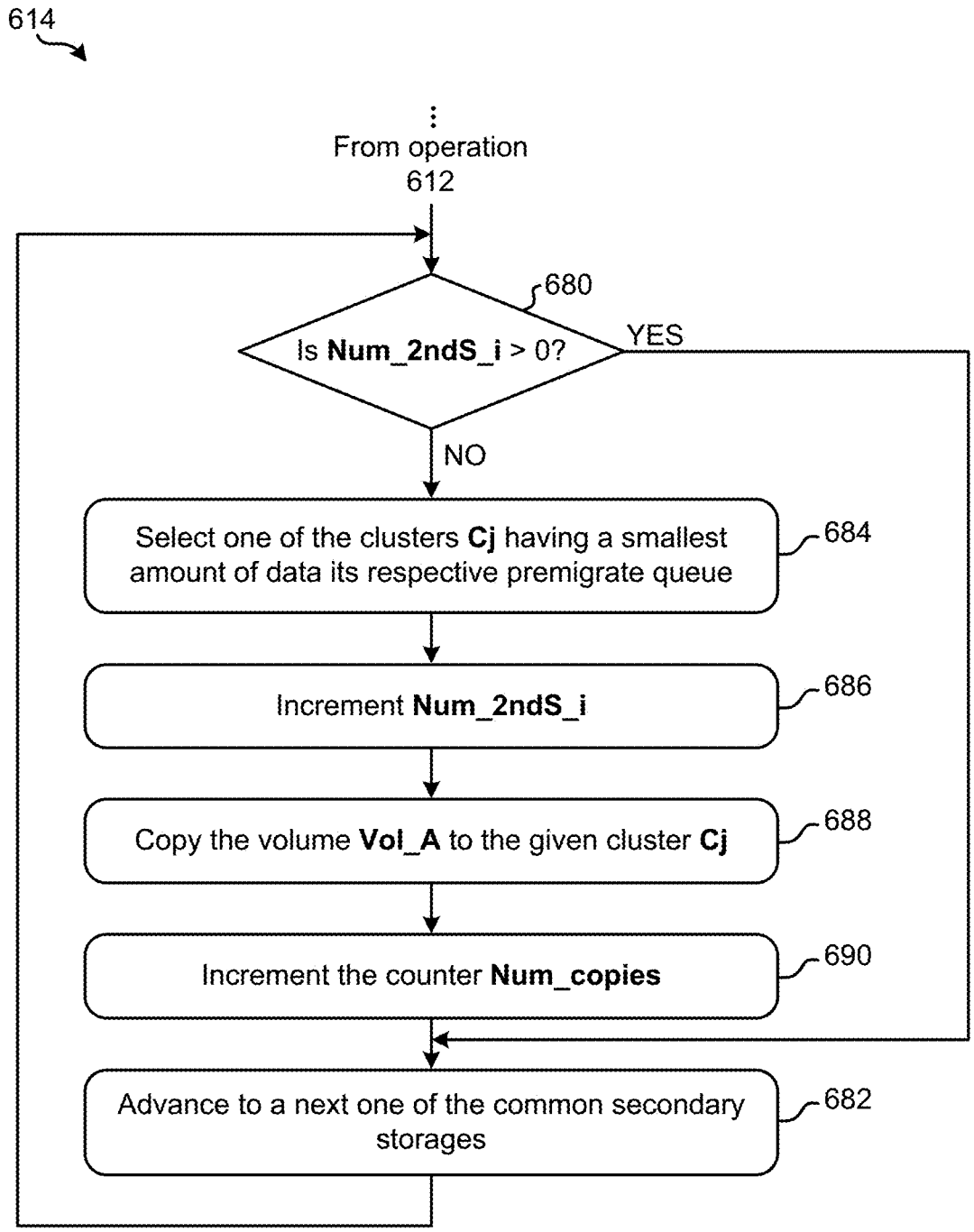
FIG. 6D is a flowchart of sub-processes for one of the operations in the method of FIG. 6A, in accordance with one embodiment.

Returning to FIG. 6A, method 600 proceeds from operation 612 to operation 614 which includes performing an operational loop for common secondary storages. This operational loop executes a copy to one of clusters that are connected with the shared cloud computing environment, and the cluster which has smallest data in its respective premigrate queue is selected. Looking now momentarily to FIG. 6D, exemplary sub-processes of performing the operational loop for common secondary storages are illustrated in accordance with one embodiment, one or more of which may be used to perform operation 614 of FIG. 6A. However, it should be noted that the sub-processes of FIG. 6D are illustrated in accordance with one embodiment which is in no way intended to limit the invention.

As shown, decision 680 includes determining whether the value of Num_2ndS_i is greater than zero, where "i" is a loop index for the cloud computing environment. According to the present in-use example, i may be equal to A, B, or C. In response to determining that the value of Num_2ndS_i is greater than zero, this indicates that any clusters that are connected to cloud i already have a copy of Vol_A. In other words, this indicates that Vol_A has been premigrated to cloud i from the clusters, and therefore it is not needed to copy Vol_A to such clusters. Accordingly, the flowchart proceeds directly to sub-operation 682, which includes advancing to a next one of the common secondary storages. However, returning to decision 680, the flowchart proceeds to sub-operation 684 in response to determining that the value of Num_2ndS_i is not greater than zero. In other words, the flowchart proceeds to sub-operation 684 in response to determining that Num_2ndS_i=0, which indicates that any clusters which are connected with cloud i do not yet have copy of Vol_A. There, sub-operation 684 includes selecting one of the clusters Cj having a smallest amount of data its respective premigrate queue. In the present in-use example, cluster C2 may be selected for 2ndS_A, e.g., according to table 650.

Proceeding to sub-operation 686, there Num_2ndS_i is incremented before proceeding to sub-operation 688 which includes actually copying the volume Vol_A to the given cluster Cj. Furthermore, sub-operation 690 includes incrementing the counter Num_copies to account for the newly created copy of the volume Vol_A formed in sub-operation 688, before returning to sub-operation 682.

It follows that the operational loop considers that in a set of clusters connected to a common secondary storage, the premigration operations to be run on a cluster in order to perform premigration of the volume to the secondary storage should not be concentrated on a specific cluster for the purposes of load balancing. It should also be noted that if the volume can be copied to at least one cluster of the set of clusters connected to a common secondary storage, the one cluster can perform premigration of the volume to the common secondary storage. However, if the selected one cluster goes offline, e.g., due to a failure before performing the premigration, Vol_A is newly copied to another cluster connected to the common cluster, and another cluster is used to perform the premigration of the volume to the common secondary storage, e.g., as would be appreciated by one skilled in the art after reading the present description.

Returning again to FIG. 6A, method 600 proceeds from operation 614 to decision 616. There, decision 616 includes determining whether there are a desired number of copies of the volume Vol_A. In other words, decision 616 includes determining whether a number of copies of the volume included in the first and second tiers is in a predetermined range. According to an example, if the domain has a prerequisite of three copies before premigration is performed to any secondary storages, decision 616 would determine whether there are at least three copies of the volume. The range may be predetermined by a user, a system administrator, industry standards, etc. Moreover, it should also be noted that "in a predetermined range" is in no way intended to limit the invention. Rather than determining whether a value is above a threshold, equivalent determinations may be made, e.g., as to whether a value is above a predetermined threshold, whether a value is outside a predetermined range, whether an absolute value is above a threshold, whether a value is below a threshold, etc., depending on the desired approach.

In response to determining that there are a desired number of copies of the volume Vol_A, the flowchart proceeds to operation 618, whereby method 600 may end. However, in response to determining that there are not a desired number of copies of the volume Vol_A, method 600 advances to operation 620. There, operation 620 includes selecting the cluster Ck having the smallest amount of data in the respective premigrate queue from all of the clusters which include a copy mode, but for which a copy operation is not yet scheduled. Moreover, operation 622 includes actually copying the volume Vol_A to the given cluster Ck. Furthermore, sub-operation 624 includes incrementing the counter Num_copies to account for the newly created copy of the volume Vol_A formed in operation 622, before returning to decision 616.

It follows that the various processes in method 600 are able to take into account the fact that there is a demand of copying a volume to primary storages of a plurality of clusters for redundancy purposes until completion of pre-migration of the volume to a secondary storage. Moreover, the clusters that are selected in this process are those to which a preference group PG0 is applied. It should also be noted that when the volume has been written onto a secondary storage, the volumes on the primary storages of those clusters may be deleted.

Moreover, various ones of the approached included herein involve a plurality of primary storages (e.g., "clusters") and a secondary storage which is shared by some of the primary storages. Some of the approaches herein are also able to determine whether a primary storage which receives a volume to be stored therein should copy the volume to other primary storages of the plurality of primary storages. This determination may be performed by determining, for each of the other primary storages, whether the primary storage is a copy target location with respect to the volume, determining, for each of those copy target locations, whether the other primary storage has a shared secondary storage. A determination is also made for each of those of the other primary storages having the shared secondary storage, whether to delete the volume on the other primary storage when the volume has been copied to the shared secondary storage. Accordingly, a copy of the volume is sent to those of the copy target locations which do not have a shared secondary storage, as well as to those of the other primary storages having a shared secondary storage which are also configured to not delete volumes that are copied thereto.

As a result, various ones of the approaches included herein avoid copying a volume to a storage location that will ultimately delete the volume after it is copied again to a secondary storage. This desirably reduces network load and avoids the unnecessary use of storage capacity, thereby increasing efficiency of performance.

As noted above, various ones of the approaches included herein may be implemented in cloud computing architectures. Accordingly, it is to be understood that although this disclosure includes a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
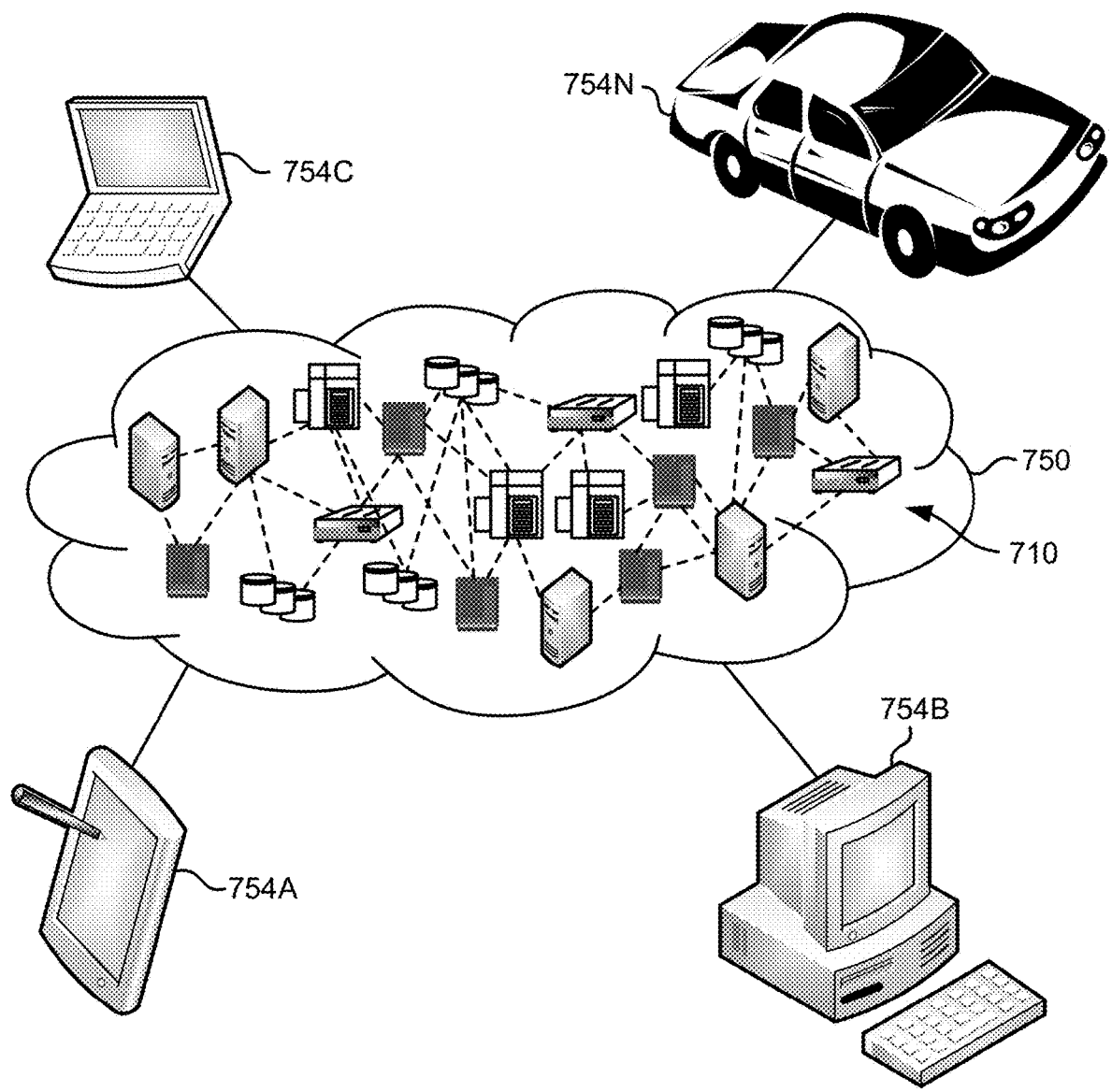
FIG. 7 is a representational view of a cloud computing environment, in accordance with one embodiment.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-754N shown in FIG. 7 are intended to be illustrative only and that computing nodes 710 and cloud computing environment 750 can communicate with any type of computerized device over any type of network and/or network addressable connection (e.g., using a web browser).

Figure 8:
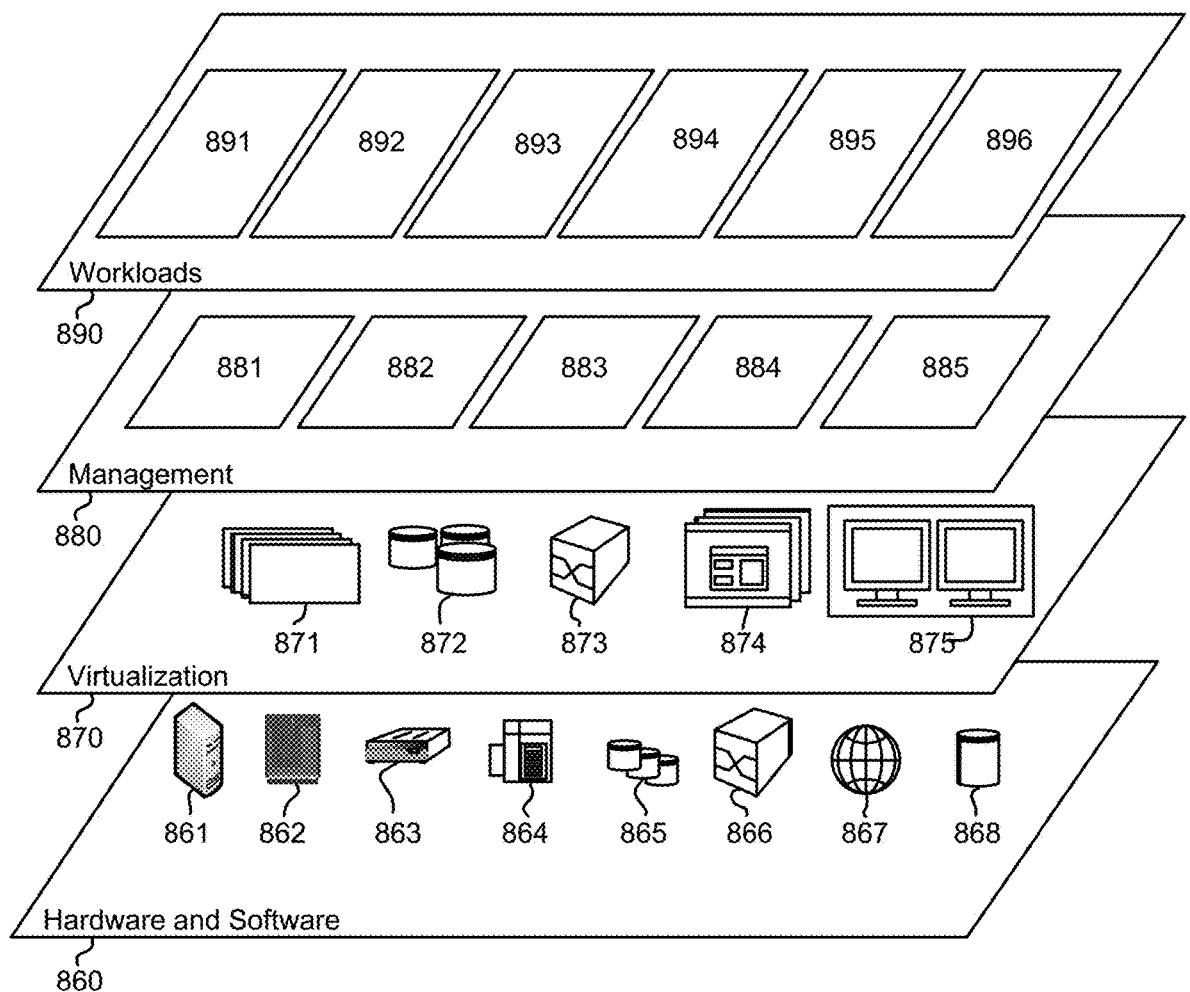
FIG. 8 is a representational view of abstraction model layers, in accordance with one embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and reducing data replications among storage locations 896, e.g., according to any of the approaches included herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving a volume of data at a first cluster in a first tier of a tiered data storage system, wherein the first tier of the tiered data storage system includes a plurality of clusters, wherein the first cluster is coupled to a secondary storage in a second tier of the tiered data storage system;
determining whether any remaining clusters in the first tier are designated as copy target locations for the volume;
in response to determining that one or more of the remaining clusters in the first tier are designated as a copy target location for the volume, for each given one of the one or more clusters designated as a copy target location for the volume:
  determining whether a given one of the one or more clusters is coupled to the secondary storage, and
  in response to determining that the given one of the one or more clusters is not coupled to the secondary storage, sending a copy of the volume to the given one of the one or more clusters; and
in response to determining that the given one of the one or more clusters is not configured to delete a copy of the volume stored therein after sending a supplementary copy of the volume to the secondary storage, sending a copy of the volume to the given one of the one or more clusters.

2. The computer-implemented method of claim 1, comprising:
in response to determining that the given one of the one or more clusters is coupled to the secondary storage, determining whether the given one of the one or more clusters is configured to delete a copy of the volume stored therein after sending a supplementary copy of the volume to the secondary storage.

3. The computer-implemented method of claim 2, wherein a copy of the volume is not sent to the given one of the one or more clusters in response to determining that the given one of the one or more clusters is configured to delete a copy of the volume stored therein after sending a supplementary copy of the volume to the secondary storage.

4. The computer-implemented method of claim 2, comprising:
determining whether a number of copies of the volume included in the first and second tiers is in a predetermined range;
in response to determining that the number of copies of the volume included in the first and second tiers is not in the predetermined range, selecting a cluster from the plurality of clusters in the first tier having a least amount of data in a respective premigrate queue; and
sending a copy of the volume to the selected cluster.

5. The computer-implemented method of claim 1, wherein each of the plurality of clusters in the first tier have a queue configured to store volumes of data, wherein the first cluster is a cluster in the first tier having a greatest amount of unused space in its respective queue.

6. The computer-implemented method of claim 1, wherein the plurality of clusters in the first tier of the tiered data storage system include hard disk drives (HDDs), wherein the secondary storage in the second tier of the tiered data storage system includes magnetic tape.

7. The computer-implemented method of claim 6, wherein the secondary storage in the second tier of the tiered data storage system is a cloud computing environment.

8. A computer program product comprising a computer readable storage medium having program instructions embodied therewith, the program instructions readable and/or executable by a processor to cause the processor to:
receive, by the processor, a volume of data at a first cluster in a first tier of a tiered data storage system, wherein the first tier of the tiered data storage system includes a plurality of clusters, wherein the first cluster is coupled to a secondary storage in a second tier of the tiered data storage system;
determine, by the processor, whether any remaining clusters in the first tier are designated as copy target locations for the volume;
in response to determining that one or more of the remaining clusters in the first tier are designated as a copy target location for the volume, for each given one of the one or more clusters designated as a copy target location for the volume:
  determine, by the processor, whether a given one of the one or more clusters is coupled to the secondary storage, and
  in response to determining that the given one of the one or more clusters is not coupled to the secondary storage, send, by the processor, a copy of the volume to the given one of the one or more clusters; and
in response to determining that the given one of the one or more clusters is coupled to the secondary storage, determine, by the processor, whether the given one of the one or more clusters is configured to delete a copy of the volume stored therein after sending a supplementary copy of the volume to the secondary storage.

9. The computer program product of claim 8, wherein the program instructions are readable and/or executable by the processor to cause the processor to:
in response to determining that the given one of the one or more clusters is not configured to delete a copy of the volume stored therein after sending a supplementary copy of the volume to the secondary storage, send, by the processor, a copy of the volume to the given one of the one or more clusters.

10. The computer program product of claim 9, wherein a copy of the volume is not sent to the given one of the one or more clusters in response to determining that the given one of the one or more clusters is configured to delete a copy of the volume stored therein after sending a supplementary copy of the volume to the secondary storage.

11. The computer program product of claim 9, wherein the program instructions are readable and/or executable by the processor to cause the processor to:
determine, by the processor, whether a number of copies of the volume included in the first and second tiers is in a predetermined range;
in response to determining that the number of copies of the volume included in the first and second tiers is not in the predetermined range, select, by the processor, a cluster from the plurality of clusters in the first tier having a least amount of data in a respective premigrate queue; and
send, by the processor, a copy of the volume to the selected cluster.

12. The computer program product of claim 8, wherein each of the plurality of clusters in the first tier have a queue configured to store volumes of data, wherein the first cluster is a cluster in the first tier having a greatest amount of unused space in its respective queue.

13. The computer program product of claim 8, wherein the plurality of clusters in the first tier of the tiered data storage system include hard disk drives (HDDs), wherein the secondary storage in the second tier of the tiered data storage system includes magnetic tape.

14. The computer program product of claim 13, wherein the secondary storage in the second tier of the tiered data storage system is a cloud computing environment.

15. A system, comprising:
a processor; and
logic integrated with the processor, executable by the processor, or integrated with and executable by the processor, the logic being configured to:
receive, by the processor, a volume of data at a first cluster in a first tier of a tiered data storage system, wherein the first tier of the tiered data storage system includes a plurality of clusters, wherein the first cluster is coupled to a secondary storage in a second tier of the tiered data storage system;
determine, by the processor, whether any remaining clusters in the first tier are designated as copy target locations for the volume;
in response to determining that one or more of the remaining clusters in the first tier are designated as a copy target location for the volume, for each given one of the one or more clusters designated as a copy target location for the volume:
  determine, by the processor, whether a given one of the one or more clusters is coupled to the secondary storage, and
  in response to determining that the given one of the one or more clusters is not coupled to the secondary storage, send, by the processor, a copy of the volume to the given one of the one or more clusters;
in response to determining that the given one of the one or more clusters is coupled to the secondary storage, determine, by the processor, whether the given one of the one or more clusters is configured to delete a copy of the volume stored therein after sending a supplementary copy of the volume to the secondary storage; and
in response to determining that the given one of the one or more clusters is not configured to delete a copy of the volume stored therein after sending a supplementary copy of the volume to the secondary storage, send, by the processor, a copy of the volume to the given one of the one or more clusters.

16. The system of claim 15, wherein a copy of the volume is not sent to the given one of the one or more clusters in response to determining that the given one of the one or more clusters is configured to delete a copy of the volume stored therein after sending a supplementary copy of the volume to the secondary storage.

17. The system of claim 15, the logic being configured to:
  determine, by the processor, whether a number of copies of the volume included in the first and second tiers is in a predetermined range;
  in response to determining that the number of copies of the volume included in the first and second tiers is not in the predetermined range, select, by the processor, a cluster from the plurality of clusters in the first tier having a least amount of data in a respective premigrate queue; and
  send, by the processor, a copy of the volume to the selected cluster.

18. The system of claim 15, wherein each of the plurality of clusters in the first tier have a queue configured to store volumes of data, wherein the first cluster is a cluster in the first tier having a greatest amount of unused space in its respective queue.

19. The system of claim 15, wherein the plurality of clusters in the first tier of the tiered data storage system include hard disk drives (HDDs), wherein the secondary storage in the second tier of the tiered data storage system includes magnetic tape, wherein the secondary storage in the second tier of the tiered data storage system is a cloud computing environment.

\* \* \* \* \*